2,950,952
CRYSTALLINE ZEOLITE T

Donald W. Breck, Tonawanda, and Nancy A. Acara, Kenmore, N.Y., assignors to Union Carbide Corporation, a corporation of New York No Drawing. Filed May 8, 1958, Ser. No. 733,819

11 Claims. (Cl. 23—113)

This invention relates to a novel composition of matter, and to a process for preparing and utilizing this novel material. More particularly, the invention is concerned with a novel synthetic member of the zeolite family.

The term "zeolite," in general, refers to a group of naturally occurring hydrated metal aluminosilicates, many of which are crystalline in structure. The synthetic material of the invention bears a structural similarity to certain of the natural crystalline zeolites. Accordingly, the term "synthetic crystalline zeolite" is applied to the materials prepared by the process of the invention. There are, however, significant differences between the synthetic and natural materials. For convenience and distinguishability, the synthetic crystalline material of the invention will be referred to hereinafter as "zeolite T."

Crystalline zeolites structurally consist basically of an open three-dimensional framework of $SiO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, e.g., alkali metal ions such as sodium and potassium ions.

The crystal structure of many zeolites also exhibit interstices of molecular dimensions. The interstitial spaces are generally occupied by water of hydration. Under proper conditions, viz., after at least partial dehydration, these zeolites may be utilized as efficient adsorbents whereby adsorbate molecules are retained within the interstitial spaces. Access to these channels is had by way of orifices in the crystal lattice. The openings limits the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves." In addition to molecular size and shape, however, other factors may also influence the selective adsorption of certain foreign molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

A number of synthetic crystalline zeolites have been prepared. They are distinguishable from each other and from the naturally occurring material on the basis of their composition, crystal structure and adsorption properties. A suitable method for distinguishing these compounds, for example, is by their X-ray powder diffraction patterns. The existence of a number of zeolites having similar but distinguishable properties advantageously permits the selection of a particular member having optimum properties for a particular use.

The present invention has as its prime object of the provision of a novel synthetic crystalline zeolite of the molecular sieve type. Another object is to provide a novel synthetic crystalline zeolite having useful adsorption properties. A further object is to provide a convenient and efficient process for preparing the novel material of the invention.

The composition of zeolite T can stoichiometrically be expressed, in terms of mole ratios of oxides, as follows:

$$1.1\pm0.4[xNa_2O:(1-x)K_2O]:Al_2O_3:6.9\pm0.5SiO_2:yH_2O$$

wherein "$x$" is any value from about 0.1 to about 0.8, and "$y$" is any value from about 0 to about 8. Minor variations in the mole ratios of these oxides within the ranges indicated by the above formula do not significantly change the crystal structure or physical properties of the zeolite.

In addition to composition, zeolite T can be identified and distinguished from other zeolites and other crystalline substances by its X-ray powder diffraction pattern, the data for which are set forth below in Table A. In obtaining the X-ray powder diffraction pattern, standard techniques were employed. The radiation was the K-alpha doublet of copper, and a Geiger counter spectrometer with a strip chart pen recorder was used. The peak heights I, and the positions as a function of $2\theta$, where $\theta$ is the Bragg angle, were read from the spectrometer chart. From these, the relative intensities $100I/I_0$, where $I_0$ is the intensity of the strongest line or peak, and $d(A.)$ observed, the interplanar spacing in Angstrom units corresponding to the recorded lines, were determined. In Table A, the more significant interplanar spacings, i.e., $d(A.)$ values, for zeolite T are given; the relative intensities of the lines are expressed as VS (very strong), S (strong), M (medium) and W (weak).

Table A

| Interplanar Spacing $d(A.)$ | Relative Intensity | Interplanar Spacing $d(A.)$ | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W |

Thus, zeolite T can be defined as a synthetic crystalline aluminosilicate having an X-ray powder diffraction pattern characterized by at least those interplanar spacing values set forth in Table A. The X-ray data given in Table B is for a typical example of zeolite T.

The X-ray powder diffraction pattern for zeolite T indicates orthorhombic unit cells having repeat distances of 6.62 Angstrom units in one cell dimension, 11.5 Angstrom units in a second cell dimension and 15.1 Angstrom units in the third cell dimension.

The particular X-ray technique and/or apparatus employed, the humidity, the temperature, the orientation of the powder crystals and other variables, all of which are well known and understood to those skilled in the art of X-ray crystallography or diffraction, may cause some variation in the intensities and positions of the X-ray lines. Thus, the X-ray data given herein to identify zeolite T are not to exclude those materials which, due to some variable mentioned above or otherwise known to those skilled in the art, fail to show all of the tabulated X-ray lines, or show a few extra ones permissible to the

Table B

| Bragg Angle, 2θ | Interplanar Spacing, d(Å.) | Relative Intensity, 100/I₀ |
| --- | --- | --- |
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.87 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.39 | 3 | crystal system of the zeolite, or show a slight change in intensity or shift in position of some of the X-ray lines as set forth in Table A.

Zeolite T can also be distinguished by the size and habit of its crystals. Prepared as hereinafter described, the zeolite is formed as a fine white crystalline powder. Electron micrographs of the powder indicate its external crystalline form to be generally rod-shaped. As a typical example of crystal size, crystals of the zeolite were found by electron micrographs to measure from about 3 to about 4 microns in length and from about 0.5 to about 0.6 microns in width.

In an embodiment of the present invention, zeolite T is prepared by suitably heating an aqueous sodium-potassium aluminosilicate mixture whose composition, expressed in terms of mole ratios of oxides, preferably falls within the following ranges:

$Na_2O/(Na_2O+K_2O)$ of from about 0.7 to about 0.8
$(Na_2O+K_2O)/SiO_2$ of from about 0.4 to about 0.5
$SiO_2/Al_2O_3$ of from about 20 to about 28
$H_2O/(Na_2O+K_2O)$ of from about 40 to about 42

The desired product is thereby crystallized out relatively free from zeolites of dissimilar crystal structure. Zeolite T can also be prepared along with other zeolitic compounds by employing a reaction mixture whose composition, expressed in terms of mole ratios of oxides, falls within the following ranges:

$Na_2O/(Na_2O+K_2O)$ of from about 0.7 to about 0.8
$(Na_2O+K_2O)/SiO_2$ of from about 0.34 to about 0.44
$SiO_2/Al_2O_3$ of from about 15 to about 30
$H_2O/(Na_2O+K_2O)$ of from about 20 to about 51

In making zeolite T, the usual method comprises dissolving sodium aluminate or alumina trihydrate, and alkali, viz., sodium and potassium hydroxide, in water, and adding this solution to a water solution of sodium silicate, or preferably to a water-silicate mixture derived at least in part from an aqueous colloidal silica solution. The resultant mixture is placed in a suitable container made, for example, of metal or glass. The container should be closed to prevent loss of water. The reaction mixture is then stirred to insure homogeneity.

The crystallization procedure can satisfactorily be carried out at temperatures within the range of from about 100° C. to about 150° C., the pressure being atmospheric, or at least that corresponding to the vapor pressure of water in equilibrium with the mixture of reactants. Preferably a temperature of approximately 100° C. is employed. Any convenient heating apparatus, e.g., an oven, sand bath, oil bath, or jacketed autoclave, can be used. Heating is continued until the desired crystalline zeolite product is formed. The zeolite crystals are then filtered off and washed to separate them from the reactant mother liquor. The zeolite crystals should be washed, preferably with distilled water, until the effluent wash water in equilibrium with the product has a pH of between about 9 and 12. As the zeolite crystals are washed, some of the sodium and potassium ions in the zeolite may be removed and are believed to be replaced by hydrogen ions. If the washing is discontinued when the pH of the effluent wash water is about 10, the

molar ratios of the crystalline product will be between about 0.9 and 1.0. Excessive washing will result in a somewhat lower value for this ratio, while insufficient washing may leave slight excesses of sodium and potassium associated with the product. Thereafter, the zeolite crystals may be dried, conveniently in a vented oven.

Typical of the manner in which zeolite T can be prepared are the following examples.

EXAMPLE 1

A solution containing 30 grams of sodium aluminate, 73.2 grams of sodium hydroxide, and 41.1 grams of potassium hydroxide in 507 grams of water was added to 745.2 grams of an aqueous colloidal silica solution containing 29.5 percent $SiO_2$ by weight. The resulting mixture, having a composition, expressed in terms of mole ratios of oxides, as follows:

$Na_2O/(Na_2O+K_2O)$ of 0.74
$(Na_2O+K_2O)/SiO_2$ of 0.4
$SiO_2/Al_2O_3$ of 28
$H_2O/(Na_2O+K_2O)$ of 42 was then stirred until homogeneous. Crystallization of the desired zeolite product was carried out by heating the reactant mixture in a sealed glass jar at a temperature of 100° C. for approximately 166 hours. The crystalline product which formed had thereupon settled to the bottom of the jar, and the reactant mother liquor was clear. The crystalline product was then filtered, washed with water until the effluent wash water had a pH of about 10.5, and dried. Analysis of the product showed it to be a zeolite having a composition, expressed in terms of mole ratios of oxides,

X-ray analysis of the product indicated a powder diffraction pattern characteristic of zeolite T, as set forth above in Tables A and B.

EXAMPLE 2

A solution containing 5.0 grams of alumina trihydrate, 15.3 grams of sodium hydroxide, and 7.16 grams of potassium hydroxide in 86.1 grams of water was added to 130 grams of an aqueous colloidal silica solution containing 29.5 percent SiO by weight. The resulting mixture, having a composition, expressed in terms of mole ratios of oxides, as follows:

$Na_2O/(Na_2O+K_2O)$ of 0.75
$(Na_2O+K_2O)/SiO_2$ of 0.4
$SiO_2/Al_2O_3$ of 20
$H_2O/(Na_2O+K_2O)$ or 40 was then stirred until homogeneous. Crystallization of the desired zeolite product was carried out by heating the reactant mixture in a sealed glass jar at a temperature of 100° C. for approximately 88 hours. The crystalline product which formed had thereupon settled in the jar, and the reactant mother liquor was clear. The crystalline product was then filtered, washed with water until the effluent wash water had a pH of about 10.5 and dried. X-ray analysis of the product indicated a powder diffraction pattern characteristic of zeolite T, as set forth above in Table A.

EXAMPLE 3

A solution containing 5.0 grams of sodium aluminate, 15.9 grams of sodium hydroxide, and 8.57 grams of potassium hydroxide in 127.3 grams of water was added to 124.2 grams of an aqueous colloidal silica solution containing 29.5 percent $SiO_2$ by weight. The resulting mixture, having a composition, expressed in terms of mole ratios of oxides, as follows:

$Na_2O/(Na_2O+K_2O)$ of 0.74
$(Na_2O+K_2O)/SiO_2$ of 0.5
$SiO_2/Al_2O_3$ of 28
$H_2O/(Na_2O+K_2O)$ of 40 was then stirred until homogeneous. Crystallization of the desired zeolite product was carried out by heating the reactant mixture in a sealed vessel at a temperature of 120° C. for approximately 8 hours. The crystalline product which formed had thereupon settled in the vessel, and the reactant mother liquor was clear. The crystalline product was then filtered, washed with water until the effluent wash had a pH of about 10.5, and dried. X-ray analysis of the product indicated a powder diffraction pattern characteristic of zeolite T, as set forth above in Table A.

EXAMPLE 4

In a manner similar to that described in Example 1 an aqueous sodium-potassium aluminosilicate mixture was prepared, having a composition, expressed in terms of mole ratios of oxides, as follows:

$Na_2O/(Na_2O+K_2O)$ of 0.74
$(Na_2O+K_2O)/SiO_2$ of 0.38
$SiO_2/Al_2O_3$ of 28
$H_2O/(Na_2O+K_2O)$ of 42

This mixture was stirred until homogeneous. Crystallization of the desired product was carried out by heating this reactant mixture in a sealed 3-liter pressure vessel at a temperature of 150° C. for approximately 22 hours. The crystalline product which formed had thereupon settled in the vessel, and the reactant mother liquor was clear. The crystalline product was then filtered, washed with water until the effluent wash water had a pH of about 10.5, and dried. X-ray analysis of the product indicated a diffraction pattern characteristic of zeolite T, as set forth above in Table A.

For satisfactory use as an adsorbent, zeolite T should be activated by at least partial dehydration. Such activation can be performed, for example, by heating the zeolite to temperatures of approximately 300° C. under atmospheric or reduced pressure, or by maintaining the zeolite at room temperature under vacuum.

Unlike common adsorbents, such as charcoal and silica gel, which show adsorption selectivities based primarily on the boiling point or critical temperature of the adsorbate, zeolite T exhibits a selectivity based on the size, degree of unsaturation, shape, polarity and polarizability of the adsorbate molecule. Among those adsorbate molecules whose size and shape are such as to permit adsorption by the zeolite, a strong preference is exhibited toward those that are polar, polarizable, unsaturated and straight-chained. This selectivity renders the zeolite most useful in the separation of polar from less polar or nonpolar molecules; polarizable from less polarizable or nonpolarizable molecules; unsaturated hydrocarbon molecules from corresponding less unsaturated or saturated molecules; and straight-chained aliphatic hydrocarbon molecules from branch-chained aliphatic, cycloaliphatic and aromatic hydrocarbon molecules.

It is to be noted that the rejection characteristics of zeolite T are as important as the adsorption characteristics. The interstitial channels of the zeolite are such that at their narrowest points, molecules with critical dimensions greater than approximately 5.0 Angstrom units will not readily enter into the channels. The term "critical dimension" as employed herein may be defined as the maximum dimension of the minimum projected cross-section of the adsorbate molecule. The term may also be defined as the diameter of the smallest cylinder which will accommodate a model of the adsorbate molecule using the best available values of bond distances, bond angles and Van der Waals' radii. Hence, molecules having critical dimensions greater than approximately 5.0 Angstrom units will be rejected by the zeolite, while those having smaller critical dimensions will be adsorbed.

Another property of zeolite T which contributes to its usefulness is that of adsorbing relatively large quantities of adsorbate at either very low pressures or concentrations. The novel material of this invention can therefore be utilized as a selective adsorbent in numerous gas or liquid separation processes, whereby small molecules such as water are separated from mixtures with other materials. The zeolite may also find use in cyclic adsorption-desorption processes for water and other adsorbates.

Samples of zeolite T, prepared from an aqueous sodium-potassium aluminosilicate solution as described above, and which had been activated by dehydration at a temperature of approximately 300° C. under vaccum, were tested to determine their adsorption properties. The results obtained are set forth in Table C. The adsorption properties were measured in a McBain adsorptive system. The zeolite samples were placed in light aluminum buckets suspended from quartz springs. They were activated in situ, and the gas or vapor under test was then admitted to the system. The gain in weight of the adsorbent was measured by the spring extensions as read by a cathetometer. In Table B, the pressure given for each adsorption is the pressure of the adsorbate. The term "Weight Percent Adsorbed" refers to the percentage increase in the weight of the adsorbent.

The tabulated adsorption data show that water is more strongly adsorbed than any other material at comparable temperatures and pressures and illustrates a major use of zeolite T, i.e., the removal of water from mixtures containing water. An example of the use to be made of the property of strong adsorption at low pressures is the drying of a stream of air or other gases that contains only small amounts of water initially. For instance, with air containing water at a temperature of 25° C. and a partial pressure of 0.1 millimeters of mercury, zeolite T adsorbs approximately 7.5 percent by weight of water. Under similar conditions, silica gel adsorbs only about 1 percent by weight of water. Similarly, this property of strong adsorption at low pressures may be utilized in the recovery of traces of ethylene, acetylene, propylene, butene and other gases from by product or waste gas streams, or in the operation of adsorption processes at higher temperatures than are normally used with common adsorbents.

Table C

| Adsorbate | Temp., °C. | Pressure, mm. Hg | Weight Percent Adsorbed |
|---|---|---|---|
| H₂O | 25 | 0.1 | 7.5 |
| | | 4.5 | 16.2 |
| | | 20 | 18.2 |
| O₂ | −196 | 0.1 | 8.4 |
| | | 10 | 13.5 |
| | | 100 | 15.8 |
| Argon | −196 | 0.1 | 8.0 |
| | | 10 | 13.5 |
| | | 120 | 16.4 |
| Propane | 25 | 10 | 1.8 |
| | | 100 | 2.5 |
| | | 700 | 2.7 |
| Propylene | 25 | 10 | 3.7 |
| | | 100 | 4.7 |
| | | 700 | 5.5 |
| n-Pentane | 25 | 10 | 6.6 |
| | | 100 | 8.1 |
| | | 400 | 11.2 |
| Cyclopropane | 25 | 10 | 0.1 |
| | | 100 | 0.8 |
| | | 700 | 1.6 |
| Iso-Butane | 25 | 700 | 0.5 |
| Thiophene | 25 | 20 | 0.9 |
| | | 70 | 4.3 |
| Benzene | 50 | 70 | 1.4 |
| | 25 | 27 | 0.9 |
| | | 75 | 2.5 |
| CO₂ | 25 | 1 | 1.0 |
| | | 10 | 3.2 |
| | | 100 | 7.3 |
| | | 700 | 10.0 |
| Butene-1 | 25 | 10 | 1.7 |
| | | 100 | 2.7 |
| | | 700 | 3.3 |
| NH₃ | 25 | 1 | 2.4 |
| | | 100 | 6.6 |
| | | 700 | 7.8 |
| Krypton | −183 | 1 | 17.0 |
| | | 10 | 23.1 |
| | | 18 | 23.5 |
| Cyclohexane | 25 | 68 | 0.8 |

The greater affinity of zeolite T for adsorbate molecules possessing a greater degree of polarity, polarizability and unsaturation can also be seen from the tabulated adsorption data. For example, the data illustrate the adsorptive selectivity of the zeolite T under similar conditions of temperature and pressure for unsaturated aliphatic compounds such as propylene and butene as compared with the corresponding saturated compounds propane and butane, and for unsaturated aromatic hydrocarbons such as benzene, as compared with corresponding saturated cyclic hydrocarbons such as cyclohexane. The data also indicate that organic sulfur compounds, generaly more polar or polarizable than their hydrocarbon counterparts, are more strongly adsorbed by zeolite T than are their hydrocarbon counterparts. For instance, under similar conditions of temperature and pressure the zeolite T evidences a greater selectivity for thiophene than for benzene. The data further serve to demonstrate the greater affinity of zeolite T under similar conditions of temperature and pressure for straight-chained aliphatic hydrocarbons such as propane as compared with the corresponding cycloaliphaic hydrocarbons such as cyclopropane and with branched-chain aliphatic hydrocarbons such as iso-butane.

Zeolite T can be used as an adsorbent for the purposes indicated above in any suitable form. For example, a column of powdered crystalline material may give excellent results as may a pelleted form obtained by pressing into pellets a mixture of the zeolite and a suitable bonding agent such as clay.

What is claimed is:

1. A synthetic crystalline zeolite having a composition, expressed in terms of mole ratios of oxides, as follows:

$$1.1 \pm 0.4[xNa_2O:(1-x)K_2O]:Al_2O_3:6.9 \pm 0.5SiO_2:yH_2O$$

wherein "x" is any value from about 0.1 to about 0.8, and "y" is any value from about 0 to about 8, said synthetic crystalline zeolite having an X-ray powder diffraction pattern essentially the same as that shown in Table A Table A

| Interplanar Spacing d(Å.) | Relative Intensity | Interplanar Spacing d(Å.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W |

2. A synthetic crystalline zeolite according to claim 1, wherein "y" is about zero.

3. A synthetic crystalline zeolite having a composition, expressed in terms of mole ratios of oxides, as follows:

$$0.49Na_2O:0.71K_2O:Al_2O_3:6.6SiO_2:6.3H_2O$$

said synthetic crystalline zeolite having an X-ray powder diffraction pattern essentially the same as that shown in Table A:

Table A

| Interplanar Spacing d(Å.) | Relative Intensity | Interplanar Spacing d(Å.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W |

4. A process for preparing a crystalline zeolite having a composition, expressed in terms of mole ratios of oxides, as follows:

$$1.1 \pm 0.4[xNa_2O:(1-x)K_2O]:Al_2O_3:6.9 \pm 0.5SiO_2:yH_2O$$

wherein "x" is any value from about 0.1 to about 0.8, and "y" is any value from about 0 to about 8, said crystalline zeolite having an X-ray powder diffraction pattern essentially the same as that shown in Table A Table A

| Interplanar Spacing d(Å.) | Relative Intensity | Interplanar Spacing d(Å.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W | which process comprises preparing an aqueous sodium-potassium aluminosilicate mixture whose composition, expressed in terms of mole ratios of oxides, falls within the following ranges:

$Na_2O/(Na_2O+K_2O)$ of from about 0.7 to about 0.8
$(Na_2O+K_2O)/SiO_2$ of from about 0.4 to about 0.5
$SiO_2/Al_2O_3$ of from about 20 to about 28
$H_2O/(Na_2O+K_2O)$ of from about 40 to about 42 and maintaining such mixture at a temperature of between about 100° C. and about 150° C. until the desired crystalline zeolite product is formed.

5. A process for preparing a crystalline zeolite having a composition, expressed in terms of mole ratios of oxides, as follows:

$$1.1 \pm 0.4[xNa_2O:(1-x)K_2O]:Al_2O_3:6.9 \pm 0.5SiO_2:yH_2O$$

wherein "x" is any value from about 0.1 to about 0.8, and "y" is any value from about 0 to about 8, said crystalline zeolite having an X-ray powder diffraction pattern essentially the same as that shown in Table A Table A

| Interplanar Spacing $d$(A.) | Relative Intensity | Interplanar Spacing $d$(A.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W | which process comprises preparing an aqueous sodium-potassium aluminosilicate mixture whose composition, expressed in terms of mole ratios of oxides, falls within the following ranges:

$Na_2O/(Na_2O+K_2O)$ of from about 0.7 to about 0.8
$(Na_2O+K_2O)/SiO_2$ of from about 0.34 to about 0.44
$SiO_2/Al_2O_3$ of from about 15 to about 30
$H_2O/(Na_2O+K_2O)$ of from about 20 to about 51 and maintaining such mixture at a temperature of between about 100° C. and about 150° C. until the desired crystalline zeolite product is formed.

6. A process for preparing a crystalline zeolite having a composition, expressed in terms of mole ratios of oxides, as follows:

$$1.1\pm0.4[xNa_2O:(1-x)K_2O]:Al_2O_3:6.9\pm0.5SiO_2:yH_2O$$

wherein "$x$" is any value from about 0.1 to about 0.8, and "$y$" is any value from about 0 to about 8 said crystalline zeolite having an X-ray powder diffraction pattern essentially the same as that shown in Table A Table A

| Interplanar Spacing $d$(A.) | Relative Intensity | Interplanar Spacing $d$(A.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W | which process comprises preparing an aqueous sodium-potassium aluminosilicate mixture whose composition, expressed in terms of mole ratios of oxides, falls within the following ranges:

$Na_2O/(Na_2O+K_2O)$ of from about 0.7 to about 0.8
$(Na_2O+K_2O)/SiO_2$ of from about 0.4 to about 0.5
$SiO_2/Al_2O_3$ of from about 20 to about 28
$H_2O/(Na_2O+K_2O)$ of from about 40 to about 42 maintaining such mixture at a temperature of approximately 100° C. until the desired crystalline zeolite product is formed, and separating the resultant crystals from the reactant mother liquor.

7. Process according to claim 6 including the additional step of washing said separated resultant crystals with water until the effluent wash water in equilibrium with said crystals has a pH value of between about 9 and 12.

8. A process for preparing a crystalline zeolite having a composition, expressed in terms of mole ratios of oxides, as follows:

$$1.1\pm0.4[xNa_2O:(1-x)K_2O]:Al_2O_3:6.9\pm0.5SiO_2:yH_2O$$

wherein "$x$" is any value from about 0.1 to about 0.8, and "$y$" is any value from about 0 to about 8 said crystalline zeolite having an X-ray powder diffraction pattern essentially the same as that shown in Table A Table A

| Interplanar Spacing $d$(A.) | Relative Intensity | Interplanar Spacing $d$(A.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W | which process comprises preparing an aqueous sodium-potassium aluminosilicate mixture whose composition, expressed in terms of mole ratios of oxides, falls within the following ranges:

$Na_2O/(Na_2O+K_2O)$ of from about 0.7 to about 0.8
$(Na_2O+K_2O)/SiO_2$ of from about 0.34 to about 0.44
$SiO_2/Al_2O_3$ of from about 15 to about 30
$H_2O/(Na_2O+K_2O)$ of from about 20 to about 51 maintaining such mixture at a temperature of approximately 100° C. until the desired crystalline zeolite product is formed, and separating the resultant crystals from the reactant mother liquor.

9. A process according to claim 8 including the additional step of washing said separated resultant crystals with water until the effluent wash water in equilibrium with said crystals has a pH value of between about 9 and 12.

10. A process for preparing a crystalline zeolite having a composition, expressed in terms of mole ratios of oxides, as follows:

$$0.49Na_2O:0.71K_2O:Al_2O_3:6.6SiO_2:6.3H_2O$$

said crystalline zeolite having an X-ray powder diffraction pattern essentially the same as that shown in Table A Table A

| Interplanar Spacing $d$(A.) | Relative Intensity | Interplanar Spacing $d$(A.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W | which process comprises forming an aqueous sodium-potassium aluminosilicate mixture whose composition, expressed in terms of mole ratios of oxides is $Na_2O/(Na_2O+K_2O)$ of 0.74
$(Na_2O+K_2O)/SiO_2$ of 0.4
$SiO_2/Al_2O_3$ of 28
$H_2O/(Na_2O+K_2O)$ of 42 maintaining such mixture at a temperature of about 100° C. until crystals are formed having the desired composition, and separating the crystals from the reactant mother liquor.

11. A process for preparing a crystalline zeolite having a composition, expressed in terms of mole ratios of oxides, as follows:

$$1.1\pm0.4[xNa_2O:(1-x)K_2O]:Al_2O_3:6.9\pm0.5SiO_2:yH_2O$$

wherein "$x$" is any value from about 0.1 to about 0.8, and "$y$" is any value from about 0 to about 8, said crystalline zeolite having an X-ray powder diffraction pattern essentially the same as that shown in Table A

Table A

| Interplanar Spacing $d$(A.) | Relative Intensity | Interplanar Spacing $d$(A.) | Relative Intensity |
|---|---|---|---|
| 11.3±0.2 | VS | 3.58±0.05 | M |
| 7.4±0.15 | W | 3.30±0.05 | W |
| 6.6±0.10 | M | 3.15±0.05 | M |
| 4.33±0.05 | M | 2.85±0.05 | S |
| 3.83±0.05 | W | 2.67±0.05 | W |
| 3.72±0.05 | S | 2.48±0.05 | W | which process comprises preparing an aqueous sodium-potassium aluminosilicate mixture whose composition, expressed in terms of mole ratios of oxides, falls within the following ranges:

$Na_2O/(Na_2O+K_2O)$ of from about 0.7 to about 0.8
$(Na_2O+K_2O)/SiO_2$ of from about 0.4 to about 0.5
$SiO_2/Al_2O_3$ of from about 20 to about 28
$H_2O/(Na_2O+K_2O)$ of from about 40 to about 42 and maintaining such mixture at a temperature of between about 100° C. and about 150° C. until the desired crystalline zeolite product is formed, and then activating said crystalline zeolite product by dehydrating such crystalline product at a temperature of approximately 300° C.

References Cited in the file of this patent
UNITED STATES PATENTS

| | | |
|---|---|---|
| 2,306,610 | Barrer | Dec. 29, 1942 |
| 2,413,134 | Barrer | Dec. 24, 1946 |
| 2,818,137 | Richmond et al. | Dec. 31, 1957 |
| 2,818,449 | Christensen et al. | Dec. 31, 1957 |
| 2,818,455 | Ballard et al. | Dec. 31, 1957 |
| 2,841,471 | Sensel | July 1, 1958 |
| 2,847,280 | Estes | Aug. 12, 1958 |

OTHER REFERENCES

Barrer et al.: J. Chem. Soc. 1952, pages 1561–1571.
Barrer: J. Soc. Chem. Ind. (London), 1945, pp. 130–135.